(12) United States Patent
Chi

(10) Patent No.: US 10,312,836 B2
(45) Date of Patent: Jun. 4, 2019

(54) DISCONNECTION DETECTION APPARATUS OF SINUSOIDAL WAVE SIGNAL

(71) Applicant: LSIS CO., LTD., Gyeonggi-do (KR)

(72) Inventor: Min-Hun Chi, Gyeonggi-do (KR)

(73) Assignee: LSIS CO., LTD., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 15/384,809

(22) Filed: Dec. 20, 2016

(65) Prior Publication Data

US 2017/0310250 A1 Oct. 26, 2017

(30) Foreign Application Priority Data

Apr. 25, 2016 (KR) .................. 10-2016-0050336

(51) Int. Cl.
| | |
|---|---|
| *H02P 3/18* | (2006.01) |
| *H02K 11/21* | (2016.01) |
| *H02P 23/16* | (2016.01) |
| *G01P 21/02* | (2006.01) |

(52) U.S. Cl.
CPC ............ *H02P 3/18* (2013.01); *G01P 21/02* (2013.01); *H02K 11/21* (2016.01); *H02P 23/16* (2016.02)

(58) Field of Classification Search
CPC . H02P 3/18; H02P 23/16; H02P 27/06; H02K 11/21; H02K 24/00; G01D 18/00; G01D 5/347; G01D 5/20; G01D 5/244
See application file for complete search history.

(56) References Cited

U.S. PATENT DOCUMENTS

| | | | | |
|---|---|---|---|---|
| 2005/0252272 | A1* | 11/2005 | Otsuka | ............ G01D 5/24457 73/1.01 |
| 2009/0206828 | A1* | 8/2009 | Yamaura | ............ G01B 7/30 324/207.25 |
| 2015/0077156 | A1* | 3/2015 | Kim | ............ G01D 5/24457 324/765.01 |
| 2015/0247746 | A1 | 9/2015 | Schindler | |
| 2015/0263659 | A1 | 9/2015 | Chi | |

(Continued)

FOREIGN PATENT DOCUMENTS

| | | |
|---|---|---|
| CN | 102998574 A * | 3/2013 |
| JP | H0580846 A | 4/1993 |
| JP | 20000353957 A | 12/2000 |

(Continued)

OTHER PUBLICATIONS

European Search Reports dated Jul. 3, 2017 in connection with the counterpart European Patent Application No. 16201184.5.

(Continued)

Primary Examiner — Eduardo Colon Santana
Assistant Examiner — Said Bouziane
(74) Attorney, Agent, or Firm — K&L Gates LLP

(57) ABSTRACT

Disclosed is a disconnection detection apparatus of a sinusoidal wave signal. The disconnection detection apparatus of the present disclosure converts a first sinusoidal wave and a second sinusoidal wave into absolute values, respectively, and determines that disconnection occurs when a value of the first sinusoidal wave is less than a first comparison value that is greater than a minimum value and a value of the second sinusoidal wave is less than a second comparison value that is less than a maximum value.

6 Claims, 4 Drawing Sheets

(56) References Cited

U.S. PATENT DOCUMENTS

2016/0054152 A1* 2/2016 Goto ................... G01D 5/2073
324/207.12
2016/0087561 A1* 3/2016 Rho ........................ H02P 6/16
318/400.04

FOREIGN PATENT DOCUMENTS

| JP | 2005335913 A | 12/2005 |
| JP | 2010014410 A | 1/2010 |
| JP | 2012-98195 A | 5/2012 |
| JP | 2012098195 A | 5/2012 |
| JP | 2015177739 A | 10/2015 |
| KR | 1020070039244 A | 4/2007 |
| KR | 20130029195 A | 3/2013 |

OTHER PUBLICATIONS

English language translation for Korean Office Action for related Korean Application No. 10-2016-0050336; (original office action document dated May 9, 2017); (8 pages).

* cited by examiner (Prior Art)

DISCONNECTION DETECTION APPARATUS OF SINUSOIDAL WAVE SIGNAL

CROSS REFERENCE TO RELATED APPLICATION

This application claims the benefit of Korean Patent Application No. 10-2016-0050336, filed on Apr. 25, 2016, entitled "APPARATUS FOR DETECTING SIGNAL WIRE OPEN", which is hereby incorporated by reference in its entirety into this application.

BACKGROUND

1. Technical Field

The present disclosure relates to a disconnection detection apparatus of a sinusoidal wave signal.

2. Description of the Related Art

Generally, a variable speed driving of an alternating current (AC) electric motor through an inverter is widely used, and there is a field requiring for an accurate speed control of an electric motor. In this case, a speed detection sensor is attached to the electric motor to detect a speed thereof.

An incremental encoder is widely used for such a speed detection sensor. The incremental encoder is roughly classified into an encoder outputting a square wave signal and an encoder outputting a sinusoidal wave signal.

The encoder for outputting a sinusoidal wave signal (a sinusoidal wave encoder) outputs two-phase sinusoidal waves having a phase difference of 90 degrees to each other by the predetermined number per a single rotation of an electric motor.

When an output signal of a sinusoidal wave encoder is disconnected, a disconnection detection apparatus, which is generally provided at an inverter, detects the disconnection of the output signal to stop an electric motor.

FIG. 1 is a block diagram of a conventional disconnection detection apparatus, and FIG. 2 is an exemplary diagram for describing a signal output from the detecting apparatus of FIG. 1.

In the conventional apparatus, an encoder 100 outputs two-phase sinusoidal wave signals (a sine signal and a cosine signal) having a phase difference of 90 degrees to each other, and a disconnection detection apparatus 200 receives the output signals of the encoder 100 to detect whether disconnection of each of the output signals occurs.

An amplification unit 210 differentially amplifies the output signals of the encoder 100, and a waveform conversion unit 220 converts the differentially amplified sine and cosine wave signals into square wave signals. Also, a disconnection detection unit 230 verifies the square wave signals to detect connection of each thereof.

In FIG. 2, 2A is waveforms obtained by differentially amplifying the sine and cosine signals which are the output signals of the sinusoidal wave encoder 100 and represents output signals of the amplification unit 210, and 2B and 2C are waveforms obtained by converting the sine and cosine wave signals which are the output signals of the differential amplification unit 210 into square wave signals and represent output signals of the waveform conversion unit 220. At this point, 2D is an A-phase square wave converted from the sine wave, and 2E is a B-phase square wave converted from the cosine wave.

Firstly, the sinusoidal wave encoder 100 attached to a shaft of an electric motor (not shown) is a position sensor that outputs a sinusoidal wave corresponding to a position variation of the shaft according to rotation of the electric motor, and the number of output signals per a single rotation of the electric motor is preset so that a variation amount of a rotation position may be obtained through the number of sinusoidal waves being output.

An operation of the conventional disconnection detection apparatus 200 will be described.

Each of output signals of the sinusoidal wave encoder 100 has a constant magnitude and a frequency that is varied according to a rotational speed of the electric motor. The amplification unit 210 serves to insulate the output signals of the sinusoidal wave encoder 100 and perform a level adjustment of the output signals, and differentially amplifies the output signals such as 2A output from the sinusoidal wave encoder 100 according to a preset gain.

The waveform conversion unit 220 compares the differentially amplified sine and cosine wave signals from the differential amplification unit 210 with a high signal when the differentially amplified sine and cosine wave signals are greater than zero, or a low signal when they are less than zero to output the A-phase or B-phase square wave signal such as 2B or 2C.

When a cosine wave signal of the output signals of the sinusoidal wave encoder 100 is disconnected as shown in a region 2F of FIG. 2, the disconnection detection unit 230 verifies the A-phase square wave and the B-phase square wave for a predetermined section and detects disconnection when the B-phase square wave does not vary while the A-phase square wave varies.

However, the disconnection detection unit 230 may detect disconnection only when variation of a sinusoidal signal occurs for a predetermined time so that there is a problem in that inrush damage to an electric motor may occur while the electric motor operates.

SUMMARY

To address the problem described above, an object of the present disclosure is to provide a disconnection detection apparatus capable of rapidly detecting disconnection of an encoder signal line based on an output signal of a sinusoidal wave encoder.

To attain the above described object, a disconnection detection apparatus of a sinusoidal wave signal may include a first conversion unit configured to convert a first sinusoidal wave and a second sinusoidal wave into absolute values, respectively, and a determination unit configured to determine that disconnection occurs when a value of the first sinusoidal wave is less than a first comparison value that is greater than a minimum value and a value of the second sinusoidal wave is less than a second comparison value that is less than a maximum value.

In one embodiment of the present disclosure, the determination unit may determine that the disconnection occurs when the value of the second sinusoidal wave is less than the first comparison value and the value of the first sinusoidal wave is less than the second comparison value.

The disconnection detection apparatus of one embodiment of the present disclosure may further include an amplification unit configured to differentially amplify the first sinusoidal wave and the second sinusoidal wave which are applied thereto, and a second conversion unit configured to convert the first differentially amplified sinusoidal wave signal and the second differentially amplified sinusoidal wave signal into a first sinusoidal wave and a second sinusoidal wave, respectively, which are digital data.

The disconnection detection apparatus of one embodiment of the present disclosure may further include an elimination unit configured to eliminate offsets of the first sinusoidal wave and the second sinusoidal wave.

In one embodiment of the present disclosure, the determination unit may determine that the disconnection does not occur when the value of the first sinusoidal wave is less than the first comparison value and the value of the second sinusoidal value is greater than the second value and is less than the maximum value.

In one embodiment of the present disclosure, the determination unit may determine that the disconnection does not occur when the value of the second sinusoidal wave is less than the first comparison value and the value of the first sinusoidal wave is greater than the second comparison value and is less than the maximum value.

As described above, in accordance with the present disclosure, there is an effect in which disconnection may be detected in a short time prior to a progress of one period of a sinusoidal wave.

DETAILED DESCRIPTION

Figure 1:
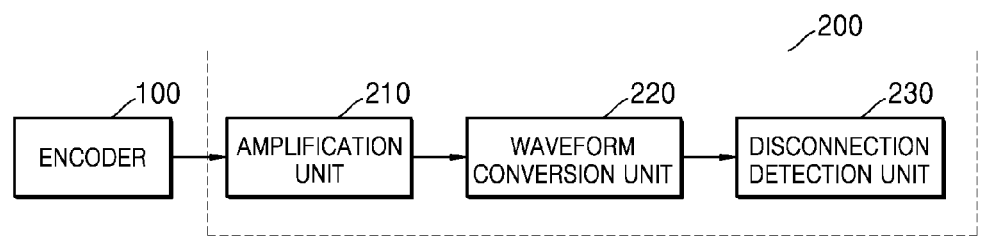
FIG. 1 is a block diagram of a conventional disconnection detection apparatus.

The present disclosure may be variously modified and will have a variety of embodiments so that specific embodiments will be exemplified in the drawings and will be described in detail. The specific embodiments disclosed herein, however, are not to be taken in a sense for limiting the present disclosure to these embodiments, but for explanation thereof and it should be understood that numerous other alternations, equivalents and substituents will be falling within the spirit and scope of the present disclosure.

Hereinafter, one preferred embodiment according to the present disclosure will be described in detail with reference to the accompanying drawings.

Figure 3:
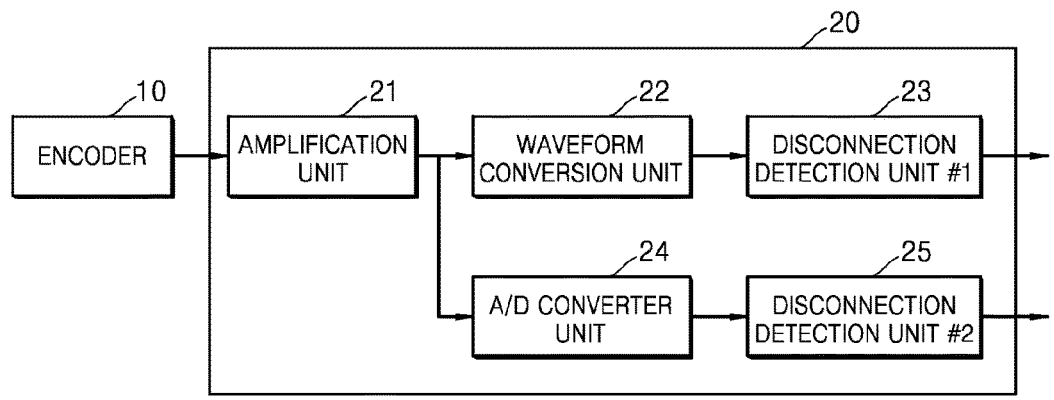
FIG. 3 is one exemplary diagram for describing a disconnection detection apparatus of a sinusoidal wave signal according to one embodiment of the present disclosure.

FIG. 3 is one exemplary diagram for describing a disconnection detection apparatus of a sinusoidal wave signal according to one embodiment of the present disclosure.

As shown in the drawing, a disconnection detection apparatus 20 of one embodiment of the present disclosure may verify a sinusoidal signal of an encoder 10 and detect disconnection when disconnection of an encoder signal line occurs to transmit the detected disconnection to an upper-level control unit (not shown), thereby stopping an operation of an electric motor.

The encoder 10 may output two-phase sinusoidal wave signals (a sine signal and a cosine signal) having a phase difference of 90 degrees by the predetermined number when the electric motor rotates a single turn.

The disconnection detection apparatus 20 of one embodiment of the present disclosure may include an amplification unit 21, a waveform conversion unit 22, a first disconnection detection unit 23, an analog/digital (A/D) converter unit 24, and a second disconnection detection unit 25.

The amplification unit 21 may differentially amplify a first sinusoidal wave signal sin and a second sinusoidal wave signal cos of the encoder 10. The waveform conversion unit 22 may convert the first differentially amplified sinusoidal wave signal sin and the second differentially amplified sinusoidal wave signal cos into square wave signals. Also, the first disconnection detection unit 23 may verify the square wave signals converted by the waveform conversion unit 22 to detect disconnection.

The A/D converter unit 24 may convert the first differentially amplified sinusoidal wave signal sin and the second differentially amplified sinusoidal wave signal cos into digital data, and also the second disconnection detection unit 25 may detect disconnection with respect to the digital data.

Operations of the amplification unit 21, the waveform conversion unit 22, and the first disconnection detection unit 23 will be described with reference to FIG. 2.

The amplification unit 21 serves to insulate the output signals of the sinusoidal wave encoder 10 and perform a level adjustment of the output signals, and may differentially amplify the signals such as 2A output from the sinusoidal wave encoder 10 according to a preset gain.

The waveform conversion unit 22 may output the first differentially amplified sinusoidal wave signal sin and the second differentially amplified sinusoidal wave signal cos from the differential amplification unit 21 as a high signal when the first differentially amplified sinusoidal wave signal sin and the second differentially amplified sinusoidal wave signal cos are greater than zero, or as a low signal when they are less than zero, thereby outputting A-phase and B-phase square wave signals such as 2B and 2C.

Figure 2:
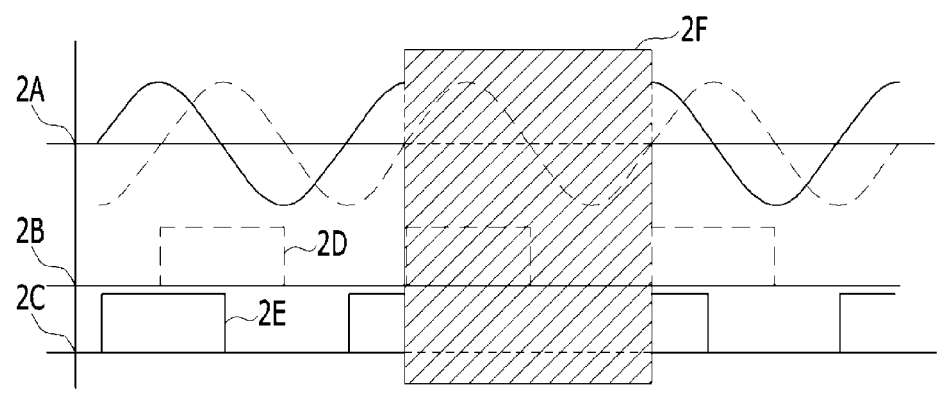
FIG. 2 is an exemplary diagram for describing signals being output from the disconnection detection apparatus of FIG. 1.

When the second sinusoidal wave signal cos of the output signals of the sinusoidal wave encoder 10 is disconnected as shown in the region 2F of FIG. 2, the first disconnection detection unit 23 may verify the A-phase square wave and the B-phase square wave for a predetermined section and detect disconnection when the B-phase square wave does not vary while the A-phase square wave varies to transmit the detected disconnection to an upper-level control unit (not shown).

Meanwhile, operations of the amplification unit 21, the A/D converter unit 24, and the second disconnection detection unit 25 will be described below with reference to the drawing.

The A/D converter unit 24 may convert the first sinusoidal wave signal and the second sinusoidal wave signal which are differentially amplified by the amplification unit 21 into digital data.

Figure 4:
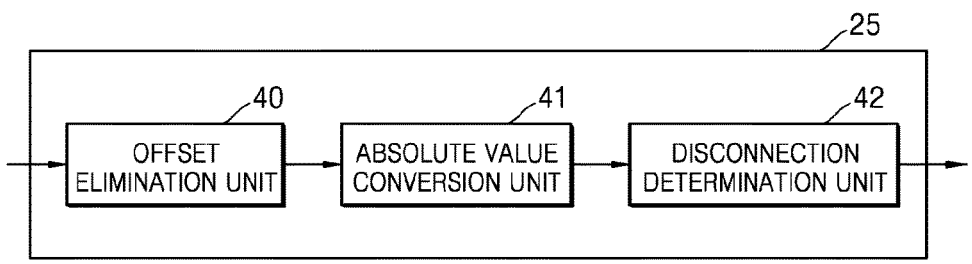
FIG. 4 is a detailed block diagram of one embodiment of a second disconnection detection unit of FIG. 3.
Figure 5:
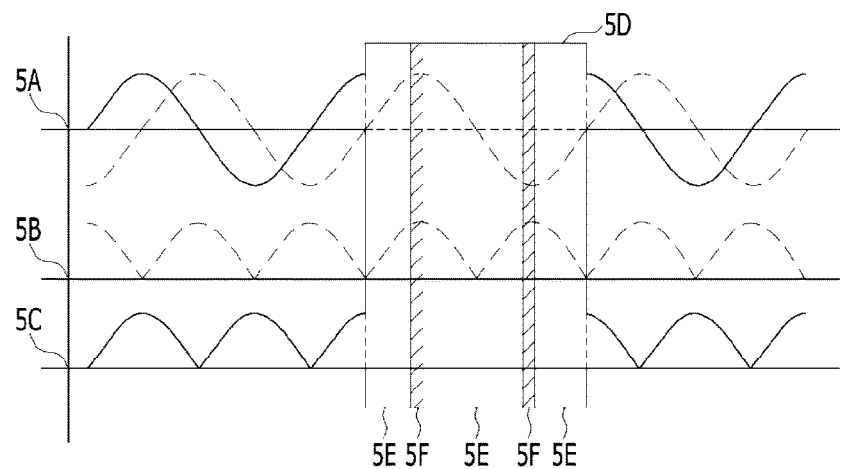
FIG. 5 is one exemplary diagram for describing signals being output from the disconnection detection apparatus of the present disclosure.
Figure 6:
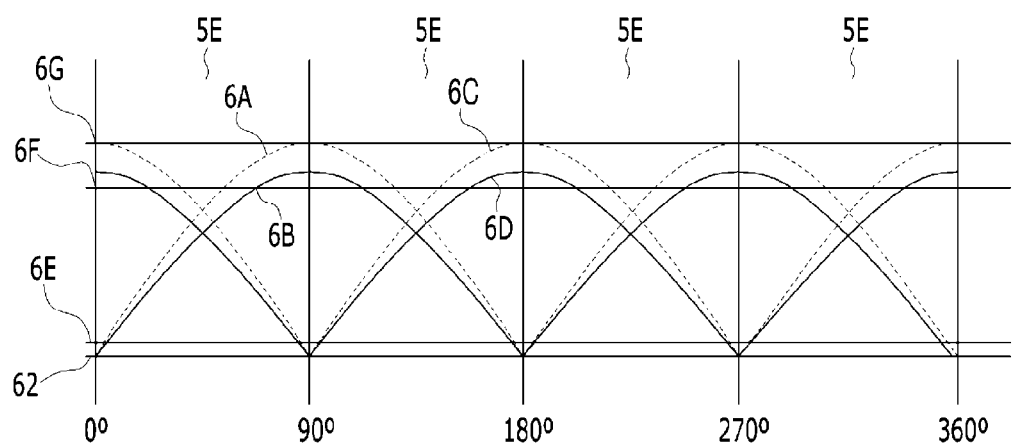
FIG. 6 is one exemplary diagram for describing a disconnection detection condition based on an output signal from the second disconnection detection unit of FIG. 4.

FIG. 4 is a detailed block diagram of one embodiment of the second disconnection detection unit of FIG. 3, FIG. 5 is one exemplary diagram for describing signals being output from the disconnection detection apparatus of the present disclosure, and FIG. 6 is one exemplary diagram for describing a disconnection detection condition based on an output signal from the second disconnection detection unit of FIG. 4.

As shown in the drawing, in the disconnection detection apparatus 20 of the present disclosure, the second disconnection detection unit 25 may include an offset elimination unit 40, an absolute value conversion unit 41, and a disconnection determination unit 42.

In FIG. 5, 5A is a waveform obtained by differentially amplifying the first sinusoidal wave signal sin and the second sinusoidal wave signal cos which are output signals of the sinusoidal wave encoder 10, and represents an output signal of the amplification unit 21. 5B and 5C are waveforms representing absolute values of the signals of 5A. At this point, 5B may represent the absolute value of the first sinusoidal wave signal sin, and 5C may represent the absolute value of the second sinusoidal wave signal cos. Also, in FIG. 5, 5D is provided to describe a region in which disconnection occurs, and, at this point, 5E represents a region in which a disconnection detection is possible and 5F represents a region in which the disconnection detection is not possible.

The offset elimination unit 40 may eliminate offsets of the first and second sinusoidal wave signals which are digital data converted by the A/D converter unit 24.

The absolute value conversion unit 41 may obtain absolute values of the first and second sinusoidal wave signals from which the offsets are eliminated to perform an absolute value process on a wave signal having a value less than zero.

The disconnection determination unit 42 may determine whether each of the first and second sinusoidal wave signals which are undergone the absolute value process corresponds to a disconnection condition to detect disconnection of a signal, and may provide the detected disconnection to the upper-level control unit (not shown) to stop an operation of the electric motor.

FIG. 6 is a diagram for describing a disconnection detection condition according to one embodiment of the present disclosure, and 6A and 6B represent a maximum magnitude and a minimum magnitude of the first sinusoidal wave signal sin, respectively. Further, 6C and 6D represent a maximum magnitude and a minimum magnitude of the second sinusoidal wave signal cos, respectively.

As described in FIG. 5, 5E represents a section in which a disconnection detection is possible, and a section in which the disconnection detection is not possible is not existed as shown in FIG. 5 in accordance with the present disclosure.

To describe the operation of the disconnection determination unit 42 again, with respect to the first sinusoidal wave signal sin of the output signals of the absolute value conversion unit 41, when a value of the first sinusoidal wave signal sin is less than a first comparison value 6E, and a value of the second sinusoidal wave signal cos is less than a maximum value 6G and is greater than a second comparison value 6F, the disconnection determination unit 42 determines that disconnection does not occur. Further, when the value of the second sinusoidal wave signal cos is less than the second comparison value 6F, the disconnection determination unit 42 may determine that disconnection occurs. This uses a condition in which a value difference at the same phase is less than a difference between the maximum value and the minimum value when absolute values of the first and second sinusoidal wave signals are obtained.

When the value of the first sinusoidal wave signal sin is greater than the first comparison value 6E, the first sinusoidal wave signal sin may be determined as not being disconnected. At this point, the first comparison value 6E may be determined as a value greater than the minimum value of the first or second sinusoidal wave signal, and the second comparison value 6F may be determined as a value less than the maximum value 6G of the first or second sinusoidal wave signal.

With respect to the second sinusoidal wave signal cos of the output signals of the absolute value conversion unit 41, when the value of the second sinusoidal wave signal cos is less than the first comparison value 6E, and the value of the first sinusoidal wave signal sin is less than the maximum value 6G and is greater than the second comparison value 6F, the disconnection determination unit 42 determines that disconnection does not occur.

When the value of the first sinusoidal wave signal sin is less than the second comparison value 6F, the disconnection determination unit 42 determines that disconnection occurs. On the other hand, when the value of the second sinusoidal wave signal cos is greater than the first comparison value 6E, the second sinusoidal wave signal cos may be determined as not being disconnected.

Figure 7:
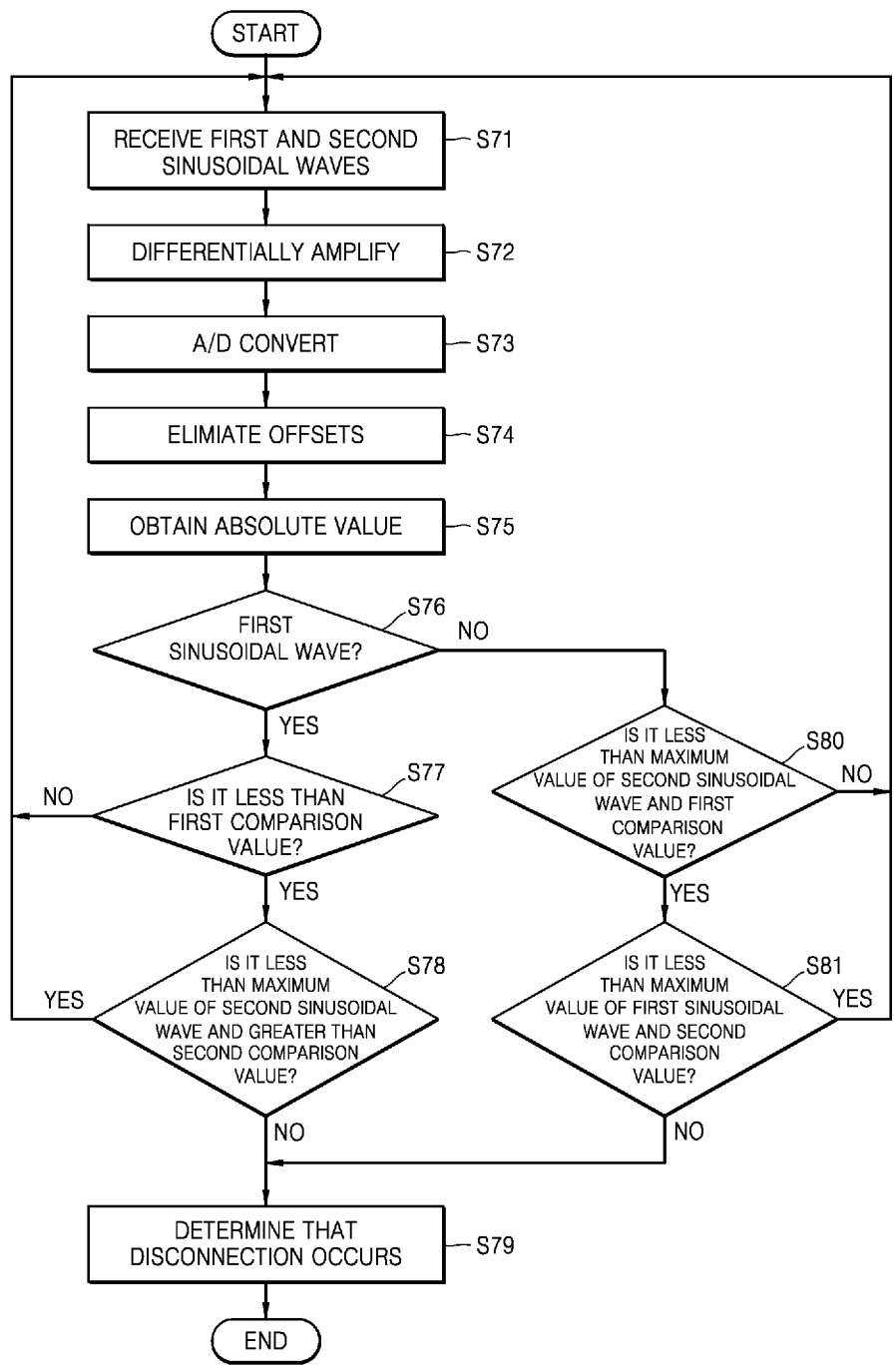
FIG. 7 is a flow chart for describing a disconnection detection method according to one embodiment of the present disclosure.

FIG. 7 is a flow chart for describing a disconnection detection method according to one embodiment of the present disclosure.

With reference to FIG. 7, operations of the amplification unit 21, the A/D converter unit 24, and the second disconnection detection unit 25 of FIG. 3 will be described.

As shown in the drawing, in one embodiment of the present disclosure, the amplification unit 21 receives the first and second sinusoidal wave signals sin and cos from the sinusoidal wave encoder 10 in Operation S71, and differentially amplifies the received signals in Operation S72. Thereafter, the A/D converter unit 24 may convert the first and second sinusoidal wave signals which are the differentially amplified analog signals into digital data in Operation S73.

The offset elimination unit 40 of the disconnection determination unit 42 may eliminate offsets of the first and second sinusoidal wave signals which are converted into the digital data in Operation S74, and the absolute value conversion unit 41 may obtain absolute values of the first and second sinusoidal wave signals to convert a portion representing a value less than zero into a corresponding absolute value in Operation S75.

When the received data is the first sinusoidal wave signal sin in Operation S76, a value of the first sinusoidal wave signal sin is less than a first comparison value 6E in Operation S77, and a value of the second sinusoidal wave signal cos is less that a second comparison value 6F in Operation S78, the disconnection determination unit 42 may determine that disconnection occurs in Operation S79. At this point, even though the value of the first sinusoidal wave signal sin is greater than the first comparison value 6E in Operation S77 or is less than the first comparison value 6E in Operation S77, when the value of the second sinusoidal wave signal cos is less than a maximum value 6G and is greater than a second comparison value 6F in Operation S78, the disconnection determination unit 42 may determine that the disconnection does not occur and it may return.

Also, when the received data is the second sinusoidal wave signal cos in Operation S76, a value of the second sinusoidal wave signal cos is less than the first comparison value 6E in Operation S80, and the value of the first sinusoidal wave signal sin is less than the second comparison value 6F in Operation S81, the disconnection determination unit 42 may determine that the disconnection occurs in Operation S79. At this point, even though the value of the second sinusoidal wave signal cos is greater than the first comparison value 6E in Operation S80 or is less than the first comparison value 6E in Operation S80, when the value of the second sinusoidal wave signal cos is less than the maximum value 6G and is greater than the second comparison value 6F in Operation S81, the disconnection determination unit 42 may determine that the disconnection does not occur and it may return.

As described above, one embodiment of the present disclosure addresses a problem in that a disconnection determination is conventionally performed after one period is progressed since disconnection occurred so that it is capable of detecting disconnection for a short time prior to a progress of one period of a sinusoidal wave.

Meanwhile, an example for detecting disconnection with respect to, for example, a sinusoidal wave output from an encoder for detecting a speed of an electric motor has been described herein, but the present disclosure is not limited thereto, and it may be used in detecting disconnection with respect to a sinusoidal wave being output from an apparatus that various sinusoidal waves.

The present disclosure has been described with reference to the embodiments shown in the drawings, but is merely an illustration, and it should be understood that numerous other modifications and equivalent other embodiments can be devised by those skilled in the art. Therefore, the technical scope of the present invention should be defined by the appended claims.

[Description of Reference Numerals]

24: A/D Converter Unit
25: Disconnection detection Unit
40: Offset Elimination Unit
41: Absolute Value Conversion Unit
42: Disconnection Determination Unit

What is claimed is:

1. A disconnection detection apparatus for determining disconnection, comprising:
   an amplification unit configured to differentially amplify the first sinusoidal wave and the second sinusoidal wave which are applied thereto;
   a waveform conversion unit configured to convert the first differentially amplified sinusoidal wave and the second differentially amplified sinusoidal wave into square wave signals;
   a disconnection detection unit configured to verify the square wave signals to detect connection of each thereof;
   a first conversion unit configured to convert the first differentially amplified sinusoidal wave and the second differentially amplified sinusoidal wave into absolute values, respectively; and
   a determination unit configured to compare a first value of the first differentially amplified sinusoidal wave with a predefined first comparison value and a predefined second comparison value, respectively, and compare a second value of the second differentially amplified sinusoidal wave with the first comparison value and the second comparison value, respectively,
   wherein the determination unit is configured to determine that a disconnection occurs when a value of the first differentially amplified sinusoidal wave is less than a first comparison value that is greater than a minimum value and a value of the second differentially amplified sinusoidal wave is less than a second comparison value that is less than a maximum value,
   wherein the first comparison value is determined as a value greater than the minimum absolute value of the first or second differentially amplified sinusoidal wave signal, and the second comparison value is determined as a value less than the maximum value of the first or second differentially amplified sinusoidal wave signal,
   wherein the determination unit determines that the disconnection occurs when the value of the second differentially amplified sinusoidal wave is less than the first comparison value and the value of the first differentially amplified sinusoidal wave is less than the second comparison value,
   wherein the determination unit determines that the disconnection does not occur when the value of the first differentially amplified sinusoidal wave signal is greater than the second comparison value, and
   wherein the determination unit determines that the disconnection does not occur when the value of the second differentially amplified sinusoidal wave signal is greater than the first comparison value.

2. The disconnection detection apparatus of claim 1, wherein the determination unit determines that the disconnection does not occur when the value of the second differentially amplified sinusoidal wave is less than the first comparison value and the value of the first differentially amplified sinusoidal wave is greater than the second comparison value and is less than the maximum value.

3. The disconnection detection apparatus of claim 1, further comprising a second conversion unit configured to convert the first differentially amplified sinusoidal wave signal and the second differentially amplified sinusoidal wave signal into a first sinusoidal wave and a second sinusoidal wave which are digital data.

4. The disconnection detection apparatus of claim 3, further comprising:
   an elimination unit configured to eliminate offsets of the first differentially amplified sinusoidal wave and the second differentially amplified sinusoidal wave.

5. The disconnection detection apparatus of claim 1, wherein the determination unit determines that the disconnection does not occur when the value of the first differentially amplified sinusoidal wave is less than the first comparison value and the value of the second differentially amplified sinusoidal value is greater than the second comparison value and is less than the maximum value.

6. The disconnection detection apparatus of claim 1, wherein the second differentially amplified sinusoidal wave has a phase difference of 90 degrees with respect to the first differentially amplified sinusoidal wave.

* * * * *